March 29, 1927.
F. ELLWEIN
BALL BEARING
Filed Jan. 17, 1924
1,622,578
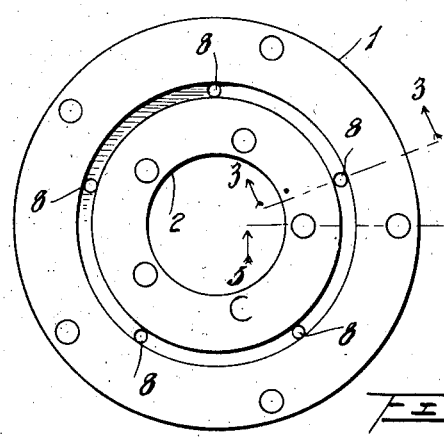
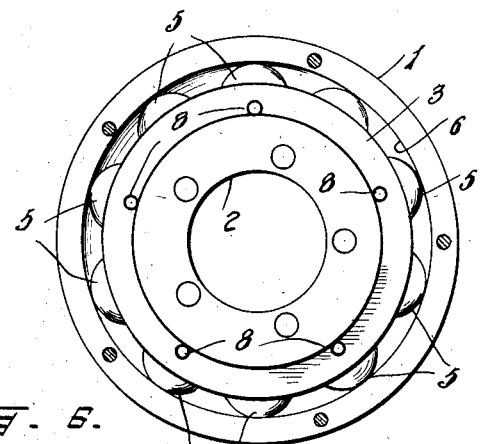
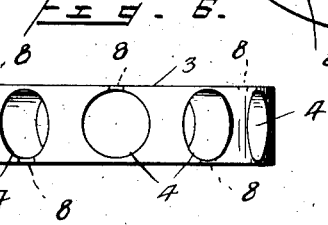
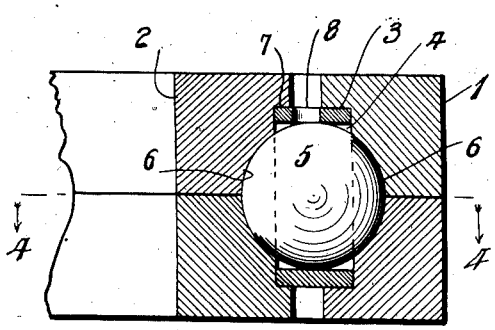
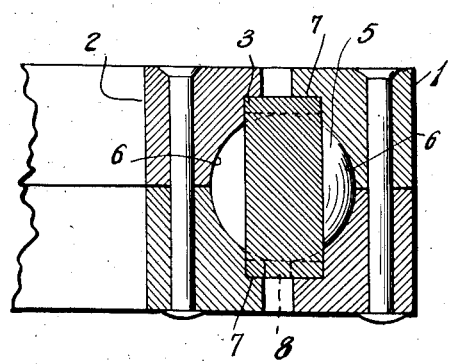
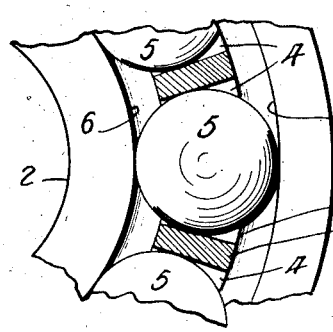
Inventor
F. Ellwein.
By
Attorney Patented Mar. 29, 1927.

1,622,578

UNITED STATES PATENT OFFICE.

FREDERICK ELLWEIN, OF OTTER CREEK, NORTH DAKOTA.

BALL BEARING.

Application filed January 17, 1924. Serial No. 686,914.

The present invention relates to bearings and has for its object to provide a ball bearing embodying a substantial inner and outer collar having ball races in their opposing sides, and an intermediate ring constituting a retainer in which is formed a plurality of openings to loosely receive balls which project beyond the inner and the outer sides of the ring and enter the races of the respective collars.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a top plan view of a ball bearing embodying the invention,

Figure 2 is a view similar to Figure 1, the top section of the outer collar being removed, Figure 3 is a sectional view on the line 3—3 of Figure 1, Figure 4 is a sectional view on the line 4—4 of Figure 3, Figure 5 is a sectional view on the line 5—5 of Figure 1, and Figure 6 is a plan view of the intermediate ring.

Corresponding and like parts are referred to in the following description and designated in the several views of the drawings by like reference characters.

The bearing comprises an outer collar 1, an inner collar 2, an intermediate ring 3 in which is formed a plurality of openings 4 and balls 5 disposed in the openings 4 and having a free movement therein and projecting beyond the inner and the outer sides of the ring 3 to enter races 6 formed in the opposing sides of the collars 1 and 2. The ring 3 constitutes a retainer for the balls 5 and is fitted in channels 7 formed in the opposing sides of the collars 1 and 2. Oil openings 8 are formed in the ring 3 to admit of oil being supplied to the balls 5.

In the preferable construction, the retainer ring 3 is of solid formation, whereas the collars 1 and 2 comprise similar or like sections which are bolted or otherwise secured after the parts are assembled. It is also observed that the sectional formation of the collars provides for taking up wear in a manner well understood.

What is claimed is:

1. A bearing of the character specified comprising inner and outer collars having races in their opposing sides, a ring rigid throughout disposed between the collars and overlapped at its flat faces by the collar and provided with a plurality of openings, and balls retained by and loosely fitting said openings and projecting beyond opposite sides of the ring and entering the races of the respective collars, said balls being removable and replaceable unitarily with said ring.

2. A bearing of the character specified comprising inner and outer sectional collars having channels and races in their opposing sides, said collars being cut away to provide shoulders, a ring rigid throughout loosely fitting the channels of the collars overlapped at its opposite flat faces by said shoulders and provided with a plurality of openings, and balls within and retained by the openings of the ring and projecting beyond opposite sides thereof and entering the races of the respective collars, said balls being removable and replaceable with said ring.

3. A bearing of the character specified comprising inner and outer collars, said collars having races in their facing surfaces, said collars outwardly of the races and at the same surfaces provided with shoulders, a ring rigid throughout disposed between the collars and at its opposite flat surfaces being overlapped by and engaging said shoulders, and balls retained by and removable and replaceable unitarily with said ring and projecting beyond opposite sides thereof and into the races.

In testimony whereof I affix my signature.

FREDERICK ELLWEIN.